United States Patent [19]

Roziere

[11] 4,187,002
[45] Feb. 5, 1980

[54] FILM FOR CORRECTING SPATIAL IRREGULARITY IN THE GAIN OF OPTICAL IMAGES OF INTENSIFIER TUBES

[75] Inventor: Guy Roziere, Paris, France

[73] Assignee: Thomson-CSF, Paris, France

[21] Appl. No.: 846,581

[22] Filed: Oct. 28, 1977

Related U.S. Application Data

[63] Continuation of Ser. No. 688,611, May 21, 1976, abandoned.

Foreign Application Priority Data

May 21, 1975 [FR] France .................. 75 16406

[51] Int. Cl.² .................... G02B 5/22; H01J 31/50
[52] U.S. Cl. .................. 350/314; 250/213 R
[58] Field of Search ........... 250/213 R, 213 VT, 487; 350/314, 162 R, 162 SF; 355/32, 33, 71; 358/253

[56] References Cited

U.S. PATENT DOCUMENTS

| | | | |
|---|---|---|---|
| 2,777,359 | 1/1957 | Debrie | 350/314 |
| 2,886,712 | 5/1959 | Schultze et al. | 250/487 |
| 3,149,968 | 9/1964 | Stephens | 350/314 |
| 3,313,940 | 4/1967 | Goodrich | 350/314 |
| 3,669,540 | 6/1972 | Rattman et al. | 350/314 |

*Primary Examiner*—Jon W. Henry
*Attorney, Agent, or Firm*—Roland Plottel

[57] ABSTRACT

The present invention relates to a film for correcting gain irregularities occurring between the different points of optical images.

The film applied to the image is split into elementary areas of constant transparency. Within each of these areas, the transparency is adjusted by opaque parts separated by transparent parts. The product of the gain of the image by the transparency of the film is maintained constant over the whole of the area of the image. In the example, these elementary areas are squares and the opaque parts are strips of fixed width.

Application is to the image intensifier tubes of scintillography circuits.

9 Claims, 5 Drawing Figures

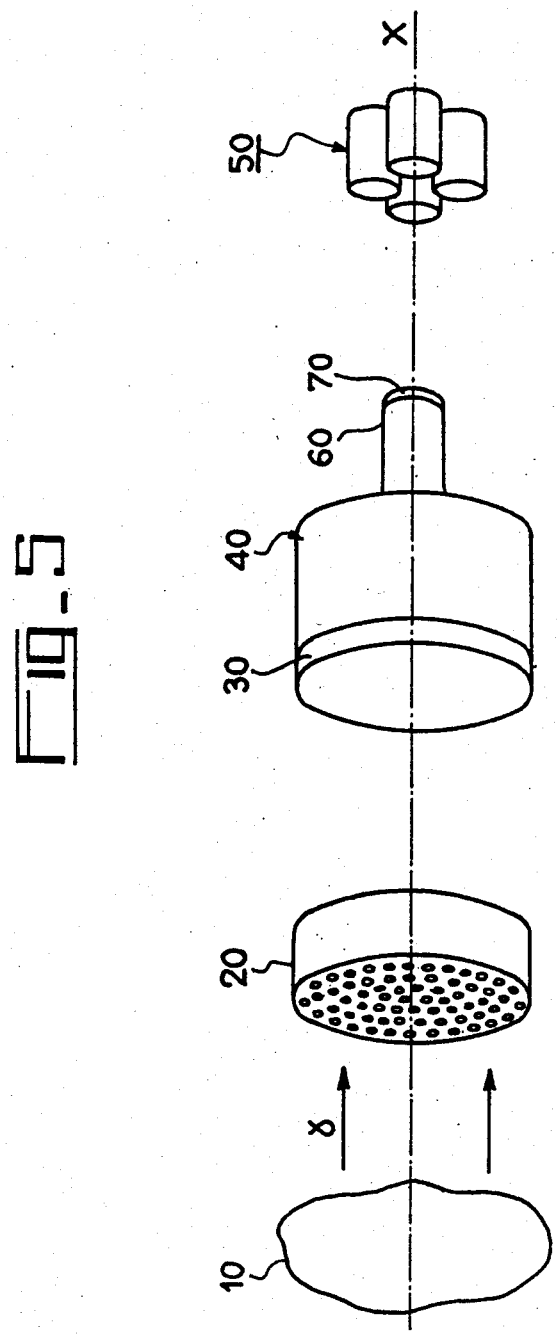

FILM FOR CORRECTING SPATIAL IRREGULARITY IN THE GAIN OF OPTICAL IMAGES OF INTENSIFIER TUBES

This is a continuation, of application Ser. No. 688,611, filed May 21, 1976 now abandoned.

The present invention relates to a film which corrects the spatial gain irregularity in optical images furnished by certain systems.

The spatial gain irregularity in question consists in the inequalities between the luminous flux emitted by the various points of the image of an object which itself produces uniform emission, the gain at each point being defined as the ratio of the luminous intensity at said point to the energy emitted by the object point corresponding to it. This irregularity, clearly, is prejudicial to proper interpretation of the resultant images.

This kind of irregularity is encountered frequently in systems of all kinds. However, it is of particular importance in the case of the optical-electronic scintillography circuits employed in medical applications for the examination of organs of the human body which have been rendered gamma-ray emissive by the injection of appropriate substances; a luminous image of the organ in question is produced on the output luminescent screen of a vacuum tube struck by the electrons emitted by the photocathode of the tube under the influence of gamma rays coming from the object. In this case, in other words, it is required to know the radiation emitted by each point in the object, which has been reached by the substance, in order to be able to distinguish it from that of lower energy coming from the same point and due to the rescattering, by this point, of radiation coming from a neighbouring point. It is, therefore, essential to ensure error-free proportionality of the luminance of an image point to the energy of the gamma radiation emitted by the corresponding point in the organ being examined. A spatial irregularity in the gain would be at odds with this requirement and would consequently falsify observations. This is why scintillography examination circuits constitute one of the major applications of the correcting device in accordance with the present invention.

It is also for this reason that in describing the invention, reference will be made to the case of the image-intensifier tube employed in these circuits, a defect in which results in the whole circuit being defective, although the invention is not limited to this case, and applies to any optical image appearing at any point in any circuit likely to be affected by such a defect. This defect may result from several causes as for example irregular emission from the photo cathode, geometrical distortions in the tube, the possible use of optical filters at the input or output of the tube, and, more rarely, an irregularity in the scintillator.

To begin with, it will be remembered that one known solution for the defect in question consists in applying to the image experiencing this defect, a photographic film the transparency of which, at any point, is the greater the lower the gain at the corresponding point of the image. This solution comes up against two problems. When preparing films of this kind, the transparency obtained at each point is not proportional to the illumination received by this point, that is to say the product of the illumination level and the exposure time, but varies with the illumination in accordance with a non-linear law corresponding to a graph having the shape of an S, working from the origin of the opacity-illumination diagram. Moreover, on said diagram this graph occupies a position which varies from one to the other of two films belonging to one and the same batch. Under these conditions, the foregoing solution would appear to be largely useless due to the fact that it is impossible to define with acceptable accuracy, the conditions under which preparation of the film designed to correct a given image is to be carried out.

The invention relates to a film correcting spatial irregularity in the gain of optical images, which does not exhibit the drawbacks of the solution referred to earlier.

The transparency at any point in the film of the invention is defined by the alternation of virtually 100% transparent zones and completely opaque zones. The magnitude of the first of these types of zones in relation to that of the second, in the film in accordance with the invention, is chosen at any point to be a function of the gain of the image at that point, in the manner which will be described in an ensuing example. In talking of points, we are not of course concerned with points in the geometric sense but with zones having a certain surface area.

The invention will be better understood from a consideration of the ensuing description and the related figures in which:

FIG. 5 is a schematic exploded view of a tube & chain in which the invention will find application.

In the example described hereinafter by way of non-limitive example, the correcting film was designed to compensate for the irregularity in the gain of the optical image furnished by the output screen of an image-intensifier tube belonging to a scintillography circuit.

A brief recapitulation of how these tubes are designed will be given here. In an input screen exposed to the radiation coming from the object, they comprise a photo-cathode. An electron stream coming from the photo-cathode under the effect of the incident radiation concentrates upon a small-sized luminescent output screen, an optical image of the object which is created by the impact of the electrons against the screen. A scintillator arranged in front of the photo cathode in the input screen converts the incident radiation into a radiation falling within the spectrum to which the photo-cathode is sensitive.

The film is stuck to the output screen of the tube. It is prepared in such a fashion that at any point it has a transparency inversely proportional to the gain at that point. To effect this kind of preparation the following procedure was adopted in an example.

Figure 1:
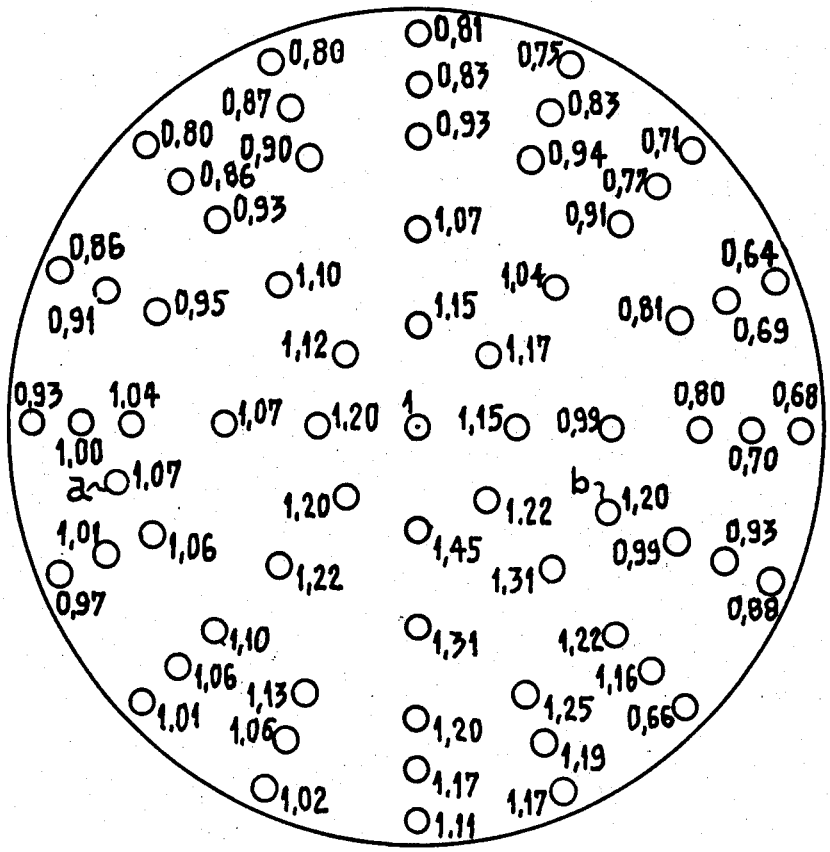
FIG. 1 is an example of the diagram produced for the preparation of a film for the correction of gain spatial irregularity, in accordance with the invention.

The tube had a circular convex input screen 347 mm in diameter; the flat output screen, likewise circular, had a diameter of 20 mm. The illumination levels at a certain number of points on the output screen, 67 in the example that is 64 points distributed at 8 diameters at an alternate rate of 6 and 10 per diameter, one point at the centre and two points a and b located asymmetrically in relation to the former, in order to act as markers, in the manner shown in FIG. 1, were plotted. These points were the images furnished by the tube under its normal operating condition, of 67 points on the input screen all experiencing the same illumination. In the example described, the 67 points on the input screen were manually excited. Moreover, in the example, no scintillator was used, the example being intended to explain the invention rather than to describe the precise compensation achieved in one or another finished tube. For the rest, as explained, the scintillator is the element least involved in the production of the irregularity or disuniformity defect. The input screen was therefore simply equipped with the photo cathode covered over the whole of its area by a thick layer of rubber constituting an opaque mask in which 67 18 mm holes were formed. With the tube located in the dark, into each of these holes an 18 mm diameter external source constituting of a gamma-ray emitter and a small scintillator converting these rays into radiation falling within the spectrum to which the photo cathode was sensible, was introduced. The effective diameter of the scintillator was 10 mm. The illumination of the corresponding image points was measured by the luminous flux received by a photo multiplier having a large input diameter, of the order of 45 mm, located at around 150 mm from the output screen. By relating these illumination levels to the illumination of one of them which was taken by way of reference, that of the central point in the present example, it was possible to plot a map of the relative illumination levels as shown in FIG. 1, where the illumination of each point has been shown.

Figure 2:
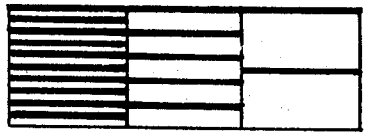
FIG. 2 illustrates examples of the preparation of elementary areas of the surface of the preceding film.

On a transparent mylar sheet the output screen was traced at large scale; in the example, the output screen, at this scale, had a diameter equal to twice that of the input screen, that is to say around 35 times its true value; then, the mapped points were plotted on this sheet. In this method, because of the small number of mapped points, an interpolation was then carried out between neighbouring points in order to define square zones of 20 mm side length, these being zones of substantially constant illumination level and therefore gain, in accordance with the most probable distribution between the mapped points. Each of these squares was masked off, in the example, using rectangular strips of black adhesive 1 mm in width, disposed parallel to one of its sides and located at regular intervals, in the manner shown in FIG. 2. The adhesive strips were stuck to the mylar sheet; with the indicated dimension, each adhesive strip covered one 20th of the surface of the square so that the latter's transparency could be adjusted to within 5%. This masking off amounts to 50% in the case of the square 1 shown in FIG. 2, to 25% in the case of the square 2, and 10% in the case of the square 3. The high-gain zones were radically masked, the lower gain zones less radically masked, the opacity of each point being proportional to the measured gain as already indicated.

Thus, by sticking strips of adhesive to the mylar sheet, straightforward adjustment of the transparency of the correcting film at any point was achieved. The film was obtained by photographing the mylar sheet and by then taking a positive gelatine print reduced to the dimensions of the output screen. This film was then stuck to the output screen using the markers.

In the cited example, the adhesive took the form of strips; this form was particularly convenient in the case of interpolation between points by squares, in the manner indicated. However, it goes without saying that in this case the adhesive could equally well have been used in the form of round spots, crosses etc., and that, generally speaking, the invention extends to all methods of preparing elementary areas of the correcting film by weighted masking, or in other words darkening off these areas using opaque elements separated by transparent zones.

In the case of these strips, it is also possible to regulate the opacity of the elementary areas in question, by using strips of constant width, spaced at greater or lesser intervals, as in the example, or, by contrast, to use strips of variable width separated by intervals of constant width, the opacity of each area being determined by the ratio of the areas thus rendered opaque to the areas left transparent.

Finally, within the context of the invention, the elementary zones can have any form differing from that of the foregoing squares, for example rectangular, circular, oval, etc.

In the example described, the procecure adopted was a manual one, that is to say the source was displaced from one to the other of the 67 locations in the mask covering the photo cathode. A very much larger number of points, of the order of several thousand, could be obtained using an automatic device enabling point by point scanning of the output screen to be carried out for example, the input screen being permanently illuminated over its whole area in a uniform fashion, this scanning making it possible, due to the large number of mapped point, to reduce the uncertainty in the interpolation between points. A device of this kind will not be described since it forms no part of the present invention.

Figure 3:
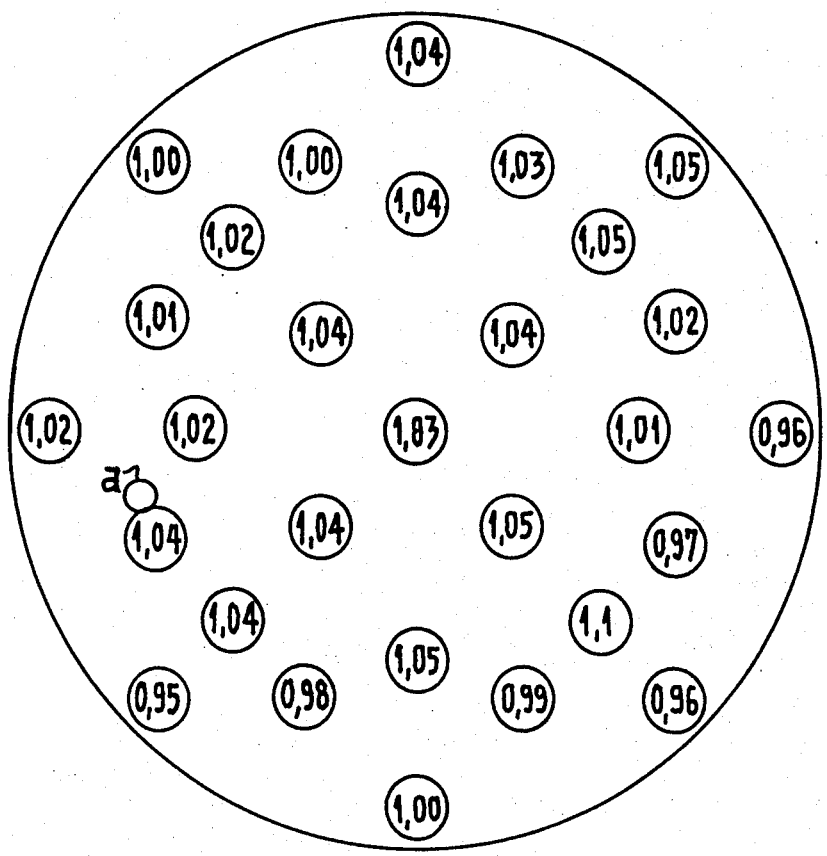
FIG. 3 illustrates the correction obtained using the film of the preceding example.

It should be pointed out, however, that even using a mapping diagram of the kind shown in the example of FIG. 1, followed by interpolation between points over distances which are substantial in relation to the dimension of these points, due to the small number of points involved, the result obtained was satisfactory. The illumination levels of circular zones 1" in diameter (25.4 mm) in the output screen of the tube in the example, after the application of the correcting film thereto, have been measured. The results obtained are indicated in FIG. 3 which illustrates a correction of better than ±5% for all the points in the screen with the exception of one.

Figure 4:
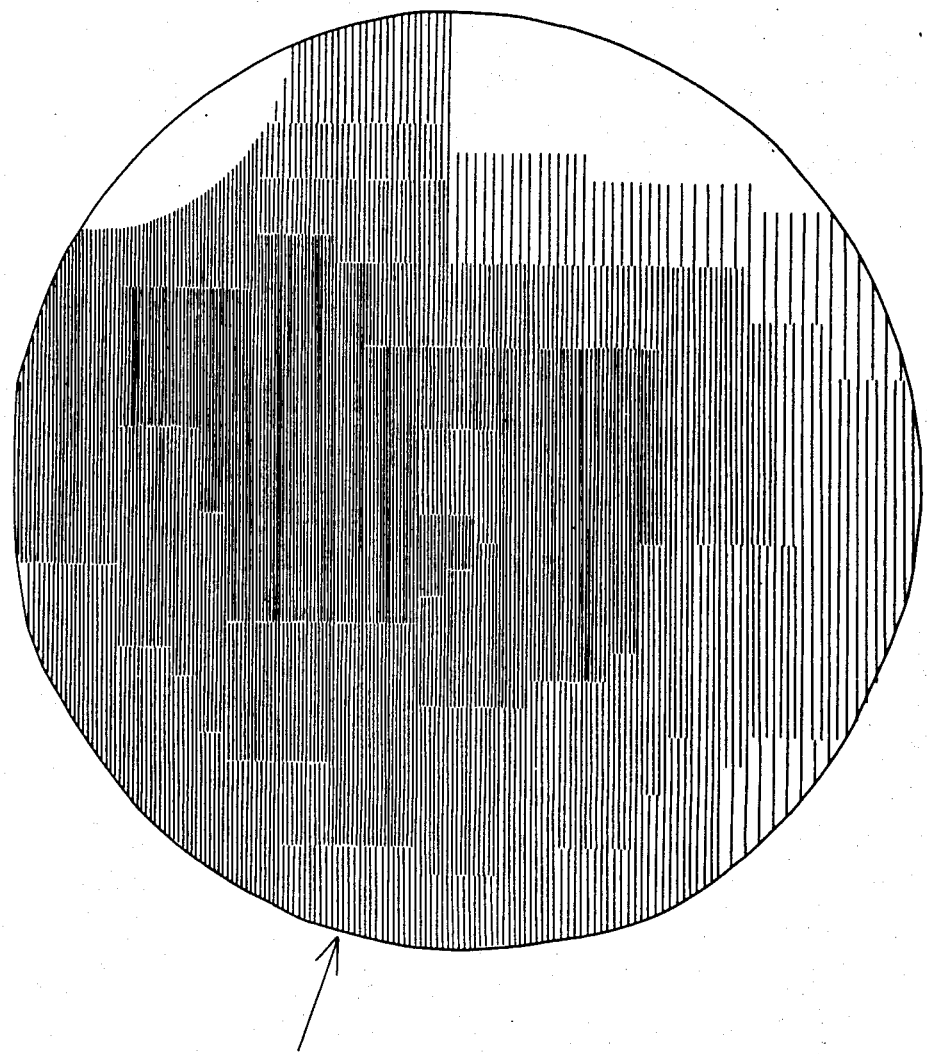
FIG. 4 illustrates a photographic positive of another example of a correcting film in accordance with the invention.

FIG. 4 is a photograph of the correcting film in accordance with another embodiment of the invention. In this figure there can be seen the zones formed by the aforementioned elementary squares for correction of the gain, the inequalities of which are clearly distinguishable. This figure corresponds to the case of a screen possessing a particularly low gain over a large part of its top edge; the arrow serves as a marker.

FIG. 5 shows by way of an example a tube and chain for scintillographic observations. In the figure there is shown the object 10, a collimator 20, an input screen 30 of an intensifier assembly 40, an output cathodeluminescent screen 60 on the end face of the assembly; and a group of four photomultipliers 50. This chain or arrangement is well known in the art. The correcting film 70 is applied on the output screen 60.

Of course, the invention is not limited to the embodiment described and shown which was given solely by way of example.

What is claimed is:

1. A film for correcting spatial irregularity in the gain of luminescent screen optical images, in combination with said screen in the path of the optical images from said screen, characterised in that said film surface is comprised of a plurality of elementary zones, each one of which exhibits a constant average transparency different from other zones and at least some of which are surrounded by other elementary zones and are made of opaque parts separated by transparent parts.

2. A correcting film as claimed in claim 1, characterised in that said elementary zones are squares; and in that said opaque parts are strips of constant width disposed parallel to two of the sides of said squares, and uniformly spaced.

3. A correcting film as claimed in claim 2, characterised in that the width of said strips is equal to one twentieth of the side length of said squares.

4. An image-intensifier tube used in scintillography the output screen of which is fitted with the film as claimed in claim 1 applied thereon.

5. The film of claim 1 wherein each zone's constant transparency is achieved by weighted masking with the opaque parts of each zone darkening its part, and the remaining transparent part being fully transparent.

6. The output luminescent screen of an image intensifier apparatus having means to correct spatial irregularities in the gain between the received radiation from an object and the displaced optical image of said object, said means comprising the film defined in claim 1 applied to said output luminescent screen.

7. A film for correcting spatial irregularity in the gain of luminescent screen optical images, which film is in combination with said screen in the path of the optical images from said screen, characterized in that its surface is comprised of a plurality of elementary zones, at least some of which are surrounded by other elementary zones, each zone exhibiting a predetermined constant average transparency of its own different from other zones made by weighted masking, i.e., having opaque parts separated by transparent parts or completely transparent parts, thereby making the transparency of each of said zones inversely proportional to the gain at that zone.

8. An apparatus having means for receiving radiation from an object and for displaying an optical image of said object on a luminescent screen, said means having spatial irregularities in its gain between the received radiation from the object and the displayed optical image of said object on said screen, a film attached to said luminescent screen having a plurality of zones, each of said zones having a constant average degree of transparency inversely proportional to the gain of said means at said zone, and at least some of said zones are surrounded by other zones and have sub units of opaque parts separated by transparent parts with the transparency over each zone being uniform.

9. An apparatus according to claim 7 wherein said screen is part of an image intensifier tube that includes an input screen of a scintillator and a photocathode, the scintillator receives the radiation from the object and converts the incident radiation to a radiation falling within the spectrum to which the photocathode is sensitive, said photocathode provides electrons in accordance therewith, and means for directing said electrons in a stream to said luminescent screen.

* * * * *